United States Patent [19]

Fry

[11] Patent Number: 5,465,097
[45] Date of Patent: Nov. 7, 1995

[54] DIRECT SEQUENCE SPREAD SPECTRUM DIRECTION FINDER

[75] Inventor: Robert J. Fry, Ottawa, Canada

[73] Assignee: Her Majesty the Queen in right of Canada, as represented by the Minister of National Defence of Her Majesty's Canadian Government, Ottawa, Canada

[21] Appl. No.: 237,925

[22] Filed: May 4, 1994

[30] Foreign Application Priority Data

Jul. 12, 1993 [CA] Canada .................................. 2100318

[51] Int. Cl.$^6$ ............................................... G01S 5/04
[52] U.S. Cl. ............................................... 342/442
[58] Field of Search .................................. 342/442, 424; 375/206

[56] References Cited

U.S. PATENT DOCUMENTS

| | | | |
|---|---|---|---|
| H292 | 6/1987 | Klose et al. ............................. | 342/394 |
| 4,443,801 | 4/1984 | Klose et al. ............................. | 342/442 |
| 4,794,395 | 12/1988 | Cindrich et al. ........................ | 342/424 |
| 5,255,000 | 9/1993 | Puzzo ..................................... | 342/442 |
| 5,265,121 | 11/1993 | Stewart .................................. | 375/99 |

OTHER PUBLICATIONS

Norman F. Krasner, "Optimal Detection of Digitally Modulated Signals"; May 1992; vol. Com–30, No.5; pp. 885–895; Published in the IEEE Transactions on Communications.

William A. Gardner, "Signal Interception: A Unifying Theoretical Frame-work for Feature Detection". Aug. 1988; pp. 897–906; published in IEEE Transactions on Communications, vol. 36, No. 8.

John Kuehls et al., "Presence Detection of Binary–Phase–Shift–Keyed and Direct–Sequence Spread–Spectrum Signals Using . . ."; Jun. 1990, pp. 914–933; published in the IEEE Journal on Selected Areas in Comm., vol. 8, No. 5.

*Primary Examiner*—Gregory C. Issing
*Attorney, Agent, or Firm*—Larson & Taylor

[57] ABSTRACT

A direction finding apparatus for detecting and locating transmitters of direct sequence spread spectrum signals has two antenna spaced apart horizontally which are connected to a tuner that is under the control of a microcomputer. The tuner bandpass filters signals in separate channels for each antenna, amplifies and converts those signals to an intermediate frequency. That intermediate frequency signal in each channel is applied to a nonlinear device to produce discrete spectral components which are applied to a bandpass filter in order to isolate a discrete spectral component in one channel and a similar component in the other channel. Each selected discrete spectral component is then digitized in A/D converters and applied to the microcomputer which determines the frequency of the spectral component and the phase difference between channels. The microcomputer can then determine an angle-of-arrival of a received signal, with respect to a baseline between the antenna, from that phase difference, the frequency and the known spacing between the antenna.

8 Claims, 1 Drawing Sheet

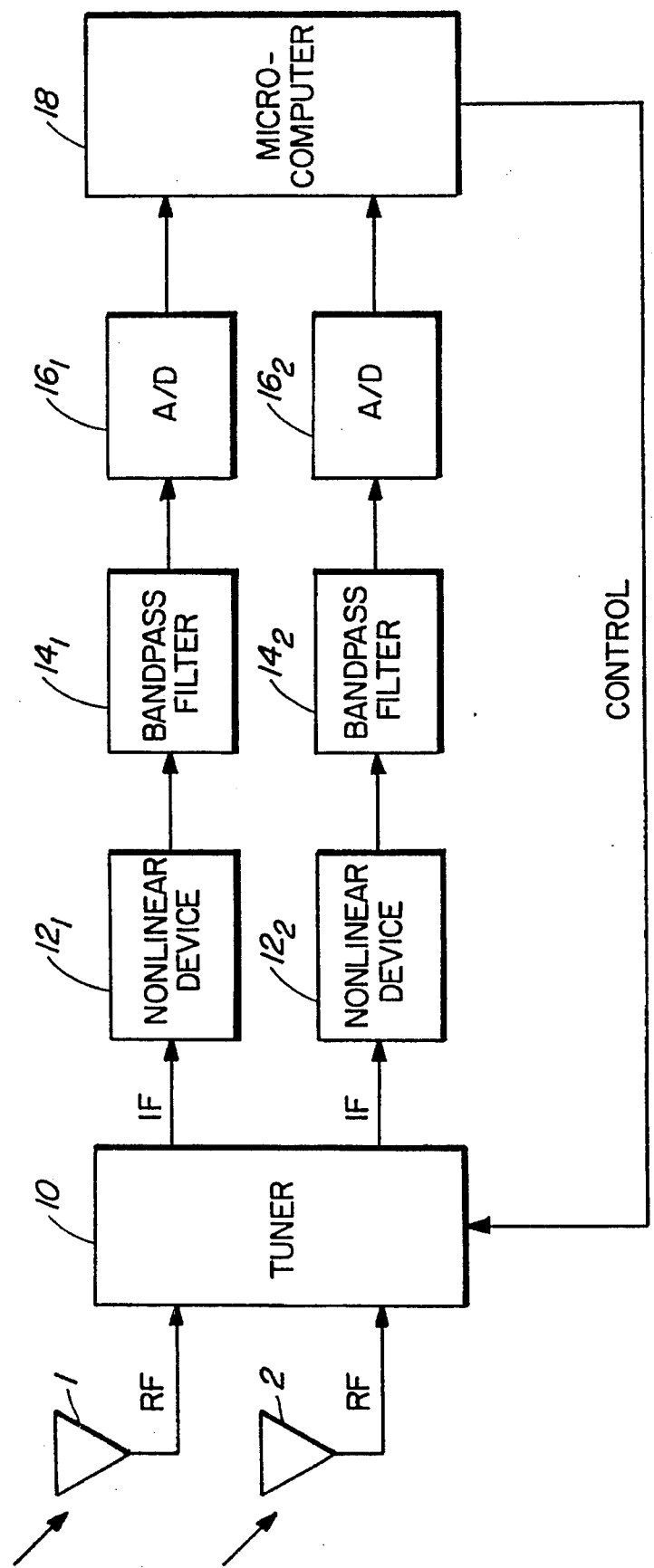

DIRECT SEQUENCE SPREAD SPECTRUM DIRECTION FINDER

FIELD OF THE INVENTION

The present invention relates to signal detection of direct sequence spread spectrum (DS/SS) signals and is particularly directed to a direction finding apparatus for detecting and locating transmitting sources of low-level BPSK and QPSK modulated radio-frequency (RF) signals by determining the angle-of arrival (AOA) of those signals at the direction finding apparatus.

BACKGROUND OF THE INVENTION

Intelligence gathering activities require the interception of signals from RF communication systems for reconnaissance and surveillance purposes. These activities include items such as detection of RF signals, the identification of sources transmitting those signals and determination of the position of each of those transmitting sources. However, a communication system which transmits direct sequence spread spectrum signals presents difficulties for both the detection of those signals, particularly for low-level signals, and in attempting to locate the positions of their transmitters.

Various types of direction finding apparatus exist at present. One direction finding apparatus uses a rotatable, highly directional, antenna connected to a receiver that can be tuned to a particular frequency. After the receiver is tuned to one frequency source, the antenna is rotated to provide a peak output from the receiver when the antenna is directed to the transmitting source for that particular frequency. This technique is time consuming and cannot perform any direction finding capability when the signal source is hopping in frequency.

Another direction finding technique is the use of two separate antenna spaced a known distance d apart from each other and measuring the time a signal from a transmitter arrives at each of the antenna. The direction of the transmitter, i.e. angle-of-arrival of the signal, can then be determined from the difference in time a signal arrives at the two antenna by cross-correlation of separate channels for each antenna. This process will provide the time difference between the signal's arrival at one antenna and its time of arrival at the other antenna. The angle-of-arrival of the signal with respect to the baseline between the antenna can then be determined from that time difference and the spacing d. This technique will operate satisfactorily for RF signals with a relatively narrow bandwidth. However, cross-correlation of wideband signals is a complex and very computationally expensive "brute-force" approach which is not practical for low-level BPSK or QPSK modulated spread spectrum signals.

Direct sequence spread spectrum systems spread their output power over bandwidths that are much greater than actually required for a given information data rate. This spreading is usually achieved by BPSK or QPSK modulation of the transmitted output signal with a high clock (chip) rate spreading sequence so as to pseudorandomly change the phase of the carrier signal at a very high rate, i.e. one that is much higher than the information data rate. The result will be the same as if the spreading sequence was added directly to the information data stream before it modulates the carrier. The bandwidth of the spreading sequence will, therefore, determine the bandwidth of the signal rather than the data rate.

The total power transmitted by direct sequence spread spectrum systems is unaffected by increasing the bandwidth of the output signal. This results in that increasing the spreading of the bandwidth of the transmitted signal will have the effect of reducing the signal's power spectral density. By spreading the bandwidth of the transmitted signal sufficiently, its power spectral density can even be reduced below the thermal background noise floor. A receiver intended to receive that transmitted signal will despread the received signal by removing the known spreading modulation to recover the initial narrow bandwidth data signal. Just as spreading the bandwidth of the transmitted signal reduced the signal's power spectral density, despreading at the intended receiver will increase the received signal's power spectral density so that the intended receiver will have a suitable signal-to-noise ratio (SNR) for demodulation of the data signal. Other receivers which do not know the particular spreading sequence used by the transmitter will be unable to despread the transmitted signal. Those other receivers will, as a result, have great difficulty in detecting and processing direct sequence spread spectrum signals. Consequently, direct sequence spread spectrum signals provide a covert means of communicating information.

Although direct sequence spread spectrum signals generally provide a covert communication system between a transmitter and an intended receiver, it is desirable for intelligence gathering purposes to be able to detect and locate those type of signal sources. A number of articles have been published in the area of spread Spectrum signal detection. One such article entitled "Optimal Detection of Digitally Modulated Signals" by Norman F. Krasner was published in the IEEE Transactions On Communications, Vol. COM-30, No. 5 on pages 885 to 895 in May 1982. This article describes optimal detectors and approximations of the optimal detectors for spread-spectrum signals which test for a signal present condition when the signal is buried in background white Gaussian noise. Another article by William A. Gardner entitled "Signal Interception: A Unifying Theoretical Framework for Feature Detection" was published on pages 897 to 906 of the IEEE Transactions On Communications, Vol. 36, No. 8, August 1988. This latter article discusses the relationships between a variety of previously proposed detectors using energy detecting techniques and proposed detectors using schemes that exploit the modulation characteristics of the signals to be detected and which is referred to as spectral correlation detection. A still further article on "Presence Detection of Binary-Phase-Shift-Keyed and Direct-Sequence Spread-Spectrum Signals Using a Prefilter-Delay-and-Multiply Device" by John F. Kuehls et al was published on pages 915 to 933 of the IEEE Journal on Selected Areas in Communications, Vol. 8, No. 5 in June 1990. This further article considers the problem of detecting the presence of either binary-phase-shift-keyed (BPSK) signals or BPSK direct sequence spread spectrum (DS/SS) signals in Gaussian noise. This article mentions that BPSK signals are not periodic because of the random nature of the sequence which shifts their phase and, hence, have a continuous Fourier spectra which makes them difficult to detect using a conventional analog spectrum analyzer or Fast Fourier Transforms. That article mentions, however, that it is known that discrete spectral components will arise when certain nonlinear operations are applied to BPSK signals and that these components are often detectable using spectrum analysis or FFT techniques. In fact, practically any nonlinear operation applied to BPSK and QPSK signals will generate these components with varying degrees of success. Therefore, a nonlinear operation can serve for the detection of BPSK signal presence by providing discrete spectral components from an unknown BPSK continuous-spectrum signal. That article then discusses a particular nonlinear operation using a quadratic transformation known as prefilter-delay-and-multiply (PFDM) for the detection of BPSK signals.

SUMMARY OF THE INVENTION

It is an object of the present invention to provide a direction finding apparatus for detecting and locating transmitters of direct sequence spread spectrum signals having negative signal-to-noise ratios.

A direction finding apparatus for detecting and locating transmitters of direct sequence spread spectrum signals, according to one embodiment of the present invention, comprises two antenna spaced apart by a distance d which are connected to inputs of a tuner that is under control of a microcomputer connected to said tuner; the tuner having means to amplify and convert signals from the two antenna to intermediate frequency (IF) signals in separate channels with IF outputs of said tuner being connected to similar nonlinear devices in each channel; outputs of each nonlinear device being connected to at least one bandpass filter having means to isolate at least one discrete spectral component in each channel, an output of each bandpass filter being connected to an analog-to-digital (A/D) converter to digitize a selected discrete spectral component from one channel and a corresponding component from the other channel, outputs of the A/D converters being connected to said microcomputer which has means to determine a frequency of a selected discrete spectral component and a phase difference between a selected discrete spectral component in one channel and a corresponding component in the other channel, said microcomputer having means to determine an angle-of-arrival of a signal with respect to a baseline between centres of the two antenna from the distance d between the antenna, said frequency and said phase difference.

A direction finding apparatus for detecting and locating transmitters of direct sequence spread spectrum signals, according to a further embodiment of the present invention, comprises two antenna spaced apart by a distance d which are connected to inputs of a tuner that is under control of a microcomputer connected to said tuner; the tuner having means to amplify and convert signals from the two antenna to intermediate frequency (IF) signals in separate channels with IF outputs of said tuner being connected to similar nonlinear devices selected from one of a frequency doubler (squaring circuit), a frequency quadrupler and a circuit having a delay and multiply device; outputs of each nonlinear device being connected to at least one bandpass filter having means to isolate at least one discrete spectral component in each channel, an output of each bandpass filter being connected to an analog-to-digital (A/D) converter to digitize a selected discrete spectral component from one channel and a corresponding component from the other channel, outputs of the A/D converters being connected to said microcomputer which has means to determine a frequency of a selected discrete spectral component and a phase difference between a selected discrete spectral component in one channel and a corresponding component in the other channel, said microcomputer having means to determine an angle-of-arrival of a signal with respect to a baseline between centres of the two antenna from the distance d between the antenna, the frequency of the spectral component and said phase difference.

BRIEF DESCRIPTION OF THE DRAWING

The present invention will now be described in more detail with reference to the single accompanying drawing which is a block diagram of a direction finding apparatus according to the present invention.

DETAILED DESCRIPTION OF THE PREFERRED EMBODIMENT

A direction finding apparatus according to the present invention is illustrated in the single drawing FIGURE. This direction finding apparatus is particularly designed for the detection of BPSK and QPSK modulated direct sequence spread spectrum signals having negative signal-to-noise ratios and for determining the direction to their transmitting source from the angle-of-arrival of those signals at the direction finder.

The signals of interest are received by two antenna 1 and 2 of the direction finding apparatus wherein the two antenna are horizontally separated from each other by a distance d. Received signals are processed separately in two channels of the direction finder. A signal from any one transmitting source will arrive at each antenna at slightly different times, due to the spacing d between the antenna, which will provide a time delay between the signal being processed in one channel and the same signal being processed in the other channel. That time delay is directly related to the distance d that the antenna are spaced apart and on the arriving signal's angle of incidence to the antenna baseline, i.e. a line between centres of the two antenna.

A tuner 10, under control of microcomputer 18, bandpass filters spread spectrum signals received from each antenna in separate channels, amplifies those signals and converts them to a suitable intermediate frequency (IF) for further processing in each channel. Each IF signal is then applied to a nonlinear device, $12_1$ in the first channel and $12_2$ in the second channel, in accordance with well established direct sequence detecting techniques such as those described in the previously mentioned publication by John F. Kuehls et al. Suitable nonlinear devices for this type of detection technique are frequency doublers (squaring circuits), frequency quadruplers or a delay and multiply circuit. Other nonlinear devices could also be used; these are just the most common. Applying these nonlinear processes to direct sequence spread spectrum signals will produce discrete spectral components at multiples of the chip rate, i.e. harmonics of the signal's chip frequency, and/or its carrier frequency. Since tuner 10 has converted a received RF signal to IF, the last term would be multiples of the IF rather than the original RF carrier frequency.

The outputs from nonlinear devices $12_1$ and $12_2$ are applied to bandpass filters $14_1$ and $14_2$ respectively. The bandpass filters $14_1$ and $14_2$ are designed to isolate the same discrete spectral components in each channel. Suitable spectral components for further processing are selected for isolation by the filters $14_1$ and $14_2$. Any selected spectral component in one channel will be phase shifted with respect to the same component in the other channel due to the time delay between the signals which are being processed in the channels, that time delay being caused by the spacing between antenna 1 and antenna 2.

The selected spectral component from filter $14_1$ is digitized by A/D converter $16_1$ in the first channel and applied to microcomputer 18. Similarly, the same selected spectral component from filter $14_2$ is digitized by A/D converter $16_2$ and applied to microcomputer 18. The microcomputer 18 then measures the frequency of the selected spectral component and the phase difference between the selected spectral component from the first and second channels using commonly known digital processing techniques such as FFTs. The signal's angle-of-arrival can then be determined by microcomputer 18 from that phase difference and frequency since the separation d of the two antenna is a known quantity. That calculated angle-of-arrival will be ambiguous as is the case with most phase comparison systems. However, that ambiguity can be resolved by rotating the antenna baseline by 90 degrees and obtaining another measurement.

The following items are ones to take into account when selecting the spectral components to measure and which determine the maximum spacing d between the antenna that can be used without creating additional ambiguities. Additional ambiguities will be created when the phase shift between the spectral components exceeds 180°. The maximum antenna spacing that minimizes this type of ambiguity is, for instance, ¼ of the wavelength $\lambda$ of the highest frequency expected to be intercepted when the selected component is twice the intermediate frequency IF. The equivalent phase shift into the nonlinear devices $14_1$ and $14_2$, using that maximum separation when a selected component is 2×IF, will be ±90° since the double frequency components that emerge from the nonlinear devices would then have a phase shift of ±180°. Similarly, if the selected spectral component is four times the IF, then the maximum antenna spacing would have to be reduced to ⅛ of the wavelength of the highest frequency expected to be intercepted in order to maintain a maximum phase shift for the selected spectral components from the nonlinear device of ±180°. The microcomputer 18 can select a suitable IF for a particular antenna spacing, the type of spectral component selected and the frequencies expected to be intercepted. If the selected spectral component is a multiple of the chip rate, however, then the phase shift of components from the nonlinear devices would be due to the phase shift of the input spreading sequence rather than the carrier frequency. This would result in having a maximum antenna separation of $c/2Nf_c$, N being a number, where C is the speed of light, $f_c$ is the chip frequency, and $Nf_c$ is the frequency of the selected spectral component.

Various modifications may be made to the preferred embodiments without departing from the spirit and scope of the invention as defined in the appended claims. For instance, although only one bandpass filter is shown in each channel of the embodiment described, a number of those bandpass filters having different bandwiths can be connected in parallel with each selecting a separate discrete spectral component for conversion to digital form by the A/D converters. The microcomputer can then select which filters to use in each channel and the particular discrete spectral components that are to be used for further processing.

The embodiments of the invention in which an exclusive property or privilege is claimed are defined as follows:

1. A direction finding apparatus for detecting and locating transmitters of direct sequence spread spectrum signals, the apparatus comprising: two antenna spaced apart by a distance d, a tuner having inputs connected to said two antenna, and a microcomputer connected to said tuner for controlling said tuner; the tuner including means for amplifying and converting signals from the two antenna to intermediate frequency (IF) signals in separate channels and said apparatus further including similar nonlinear devices in each channel for receiving said IF signals from said tuner; at least one bandpass filter connected to outputs of each nonlinear device and including means for isolating at least one discrete spectral component in each channel; an analog-to-digital (A/D) converter connected to an output of each bandpass filter for digitizing a selected discrete spectral component from one channel and a corresponding component from the other channel, outputs of the A/D converters being connected to said microcomputer and said micrometer including means for determining a frequency of a selected discrete spectral component and a phase difference between a selected discrete spectral component in one channel and a corresponding component in the other channel, said microcomputer further including means for determining an angle-of-arrival of a signal with respect to a baseline between centers of the two antenna from the distance d between the antenna, said frequency and said phase difference.

2. A direction finding apparatus for detecting and locating transmitters of direct sequence spread spectrum signals, the apparatus comprising two antenna spaced apart by a distance d, a tuner having inputs connected to said two antenna, and a microcomputer connected to said tuner for controlling said tuner; the tuner including means for amplifying and converting signals from the two antenna to intermediate frequency (IF) signals in separate channels and said apparatus further comprising similar nonlinear devices in each channel for receiving said IF signals from said tuner, said nonlinear devices comprising a nonlinear circuit selected from the group consisting of a frequency doubler circuit, a frequency quadrupler circuit and a circuit including a delay and multiply device; at least one bandpass filter connected to outputs of each nonlinear device and including means for isolating at least one discrete spectral component in each channel, an analog-to-digital (A/D) converter connected to an output of each bandpass filter for digitizing a selected discrete spectral component from one channel and a corresponding component from the other channel, outputs of the A/D converters being connected to said microcomputer and said microcomputer including means for determining a frequency of a selected discrete spectral component and a phase difference between a selected discrete spectral component in one channel and a corresponding component in the other channel, said microcomputer further including means for determining an angle-of-arrival of a signal with respect to a baseline between centers of the two antenna from the distance d between the antenna, said frequency and said phase difference.

3. A direction finding apparatus as defined in claim 1, wherein the maximum antenna spacing d is ½N, N being a number, of the wavelength $\lambda$ of the highest frequency expected to be intercepted by said antenna when said selected component is N×IF.

4. A direction finding apparatus as defined in claim 1, wherein a detected spread spectrum signal has a chip frequency $f_c$ and the maximum antenna spacing d is $C/2Nf_c$, N being a number and C being the speed of light, when the selected spectral component is N times the chip frequency $f_c$.

5. A direction finding apparatus as defined in claim 2, wherein the maximum antenna spacing d is ½N, N being a number of the wavelength $\lambda$ of the highest frequency expected to be intercepted by said antenna when said selected component is N×IF.

6. A direction finding apparatus as defined in claim 2, wherein a detected spread spectrum signal has a chip frequency $f_c$ and the maximum antenna spacing d is $C/2Nf_c$, N being a number and C being the speed of light, when the selected spectral component is N times the chip frequency $f_c$.

7. A direction finding apparatus as defined in claim 1, wherein a number of bandpass filters are located in each channel to isolate a number of discrete spectral components in each channel, the microcomputer having means to select one discrete spectral component in one channel and a corresponding component in the other channel.

8. A direction finding apparatus as defined in claim 2, wherein a number of bandpass filters are located in each channel to isolate a number of discrete spectral components in each channel, the microcomputer having means to select one discrete spectral component in one channel and a corresponding component in the other channel.

* * * * *